United States Patent [19]

Satoh et al.

[11] 3,928,539
[45] Dec. 23, 1975

[54] METHOD FOR CONTINUOUSLY PRODUCING HYDRATED CALCIUM SILICATES

[75] Inventors: Hirokazu Satoh; Hidesato Takeuchi; Shigeki Oikawa, all of Tokyo, Japan

[73] Assignee: Onoda Chemical Industry Company, Limited, Tokyo, Japan

[22] Filed: Jan. 7, 1974

[21] Appl. No.: 431,222

[52] U.S. Cl. ................................. 423/326; 423/331
[51] Int. Cl.$^2$ .................. C01B 33/20; C01B 33/24
[58] Field of Search ........... 423/326, 325, 331, 155, 423/158; 106/89, 98

[56] References Cited
UNITED STATES PATENTS

| | | | |
|---|---|---|---|
| 2,215,891 | 9/1940 | Thomson | 423/331 |
| 2,241,791 | 5/1941 | Rembert | 423/331 |
| 2,888,322 | 5/1959 | Podschus | 423/331 |
| 2,888,377 | 5/1959 | Allen | 423/331 |
| 2,905,531 | 9/1959 | Schneider | 423/331 |
| 3,033,648 | 5/1962 | Linden | 423/331 |
| 3,046,152 | 7/1962 | Shiraishi | 423/331 |
| 3,115,391 | 12/1963 | Leineweber | 423/331 |
| 3,257,220 | 6/1966 | Kalousek | 423/331 |
| 3,401,015 | 9/1968 | Ninger | 423/331 |
| 3,501,324 | 3/1970 | Kubo | 423/331 |

*Primary Examiner*—Peter D. Rosenberg
*Attorney, Agent, or Firm*—Oblon, Fisher, Spivak, McClelland & Maier

[57] ABSTRACT

A method for producing hydrous calcium silicates such as xonotlite, tobermorite and the like, which comprises interacting a siliceous material and a calcareous material or a siliceous material, a calcareous material and a small amount of a magnesia material in aqueous slurry to make above 50% by weight of gelation materials at 50°–100°C, rapidly raising the temperature of the gelation slurry to above 160°C continuously with pressurized water of high temperature allowing to stand the slurry at the temperature for a definite time and then continuously discharging the reaction product.

9 Claims, No Drawings

METHOD FOR CONTINUOUSLY PRODUCING HYDRATED CALCIUM SILICATES

BACKGROUND OF THE INVENTION

This invention relates to a method for continuously producing hydrated calcium silicates, which comprises hydrothermally reacting siliceous material with calcareous material in aqueous slurry under high temperature and high pressure. The hydrate calcium silicates obtained by the present invention are highly crystallized hydrated calcium silicates such as xonotlite, tobermorite, etc. or mixture thereof.

Heretofore, hydrated calcium silicates have been produced batchwise by batch-wise reactions of a siliceous material with a calcareous material in aqueous slurry under saturated steam at above 100°C. The properties of the calcium silicate hydrate thereby obtained varies with the ratio of materials, the reaction temperature, the reaction pressure and the reaction time. The following reaction process is supposed in the case of reactant mixture having $CaO/SiO_2$(molar ratio) of about 1.

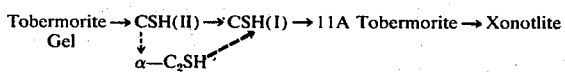

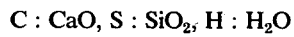

C : CaO, S : $SiO_2$, H : $H_2O$

The calcium silicates prepared by the prior art have many defects as follows.

1. It is not economical to produce hydrated calcium silicates by the batch process of the prior art, because it takes much time to produce it.
2. It is especially difficult to produce hydrated calcium silicates which have suitable physical properties for different objects.
3. It is very difficult to improve the moulding performance and the strength of a green body which is moulded with a slurry of a mixture of hydrated calcium silicates produced by the prior art and fibers such as asbestos fiber, and when the green body is dried to produce the product, it is difficult to adjust the drying shrinkage and the strength thereof and to decrease the warp thereof.

To improve the defects of those products, there have been proposed some methods, for example the method adding clay or the like to the slurry of hydrated calcium silicates. However, the method is unsatisfactory, because longer moulding time is needed and the drying shrinkage of those products increases proportionally to the amount of additives such as clay. Also, the batch-wise method for the production of calcium silicate hydrate by hydrothermal reaction of a siliceous material with a calcareous material in the presence of caustic alkali to shorten the reaction time has been proposed, but in proportion to an amount of caustic alkali, the degree of crystallinity of hydrated calcium silicates has decreased and uniform crystals of calcium silicate hydrate could not be obtained. Especially, when caustic alkali of more than 1% (wt.) was added to the weight of the xonotlite produced by the reaction, xonotlite crystal could not be prepared or even if the xonotlite was produced, the resultant moulded product from the xonotlite slurry had remarkably increased drying shrinkage and very interior resistibity against high temperature.

According to the present invention there is provided a method for continuously producing hydrated calcium silicates comprising reacting hydrothermally a siliceous material and a calcerous material at 50°–100°C until at least 50% of the total CaO and $SiO_2$ in the starting materials has been gelled, taking out the gelled slurry continuously and raising its temperature to above 160°C by continuously adding pressurized water of high temperature and high pressure, allowing to stand it at the temperature during a definite time and discharging continuously the slurry of hydrated calcium silicates from the pressure apparatus.

The present invention is merely a method which produces hydrated calcium silicates continuously. We paid special attention to that the formation and the growth of the hydrated calcium silicates were influenced by the chemical and physical conditions, on producing the hydrated calcium silicates by hydrothermal reaction between a siliceous material and a calcareous material, and found that the physical properties of the hydrated calcium silicates and the course of reaction in the continuous process present a striking contrast to that in the batch process.

An object of the present invention is to provide a method for efficiently and economically producing hydrated calcium silicate.

Another object of the present invention is to provide a method for producing hydrated calcium silicates, whose properties can be changed freely according to the purposes.

Still another object of the present invention is to provide a method for producing hydrated calcium silicates favouring green bodies, which are moulded from the hydrated calcium silicates slurry mixed with fibers such as asbestos fiber, and have higher strength and less drying shrinkage.

A still further object of the present invention is to provide a method for producing hydrated calcium silicates slurry having less filtration resistance and better moulding property and having less drying and firing shrinkage.

The other objects of the present invention will be apparent from the following description.

The detailed embodiments of the present invention are described hereinafter.

The siliceous material used by the present invention is a finely natural amorphous siliceous material (less than 200 mesh) such as siliceous sinter, acid earth, diatomaceous earth and soft siliceous stone, a finely synthetic siliceous material such as white carbon, or a by-product amorphous siliceous material such as, as dust produced in the production of ferrosilicon, a silicic acid by-product in the production of cryolite from sodium silicofluoride or a mixture of the above siliceous material and a finely divided crystalline siliceous material, and a calcareous material used by the present invention is slaked lime, quick lime and/or calcium carbide residuum.

The ratio of $SiO_2/CaO$, in the raw mixture, must be principally controlled in the range of 1.00:0.6–1.3 to accord with the chemical composition of the hydrated calcium silicates to be produced. The quantity of the water used for the slurry differs somewhat with the process condition, and is about 2.5–20 times to the total weight of raw materials and the reacting time of 1–5 hours are recommended to the gelating process. The mixture is recommended to be agitated during the gelation to prevent the sedimentation of the raw materials and adhesion and solidification of gel produced.

The present invention is characterized by producing gel which comprises tobermorite gel, CSH(II) and CSH(I) by interaction of siliceous and calcareous materials in aqueous slurry and then producing calcium silicate hydrate by hydrothermally reacting the gelation slurry. When the gelation slurry gelled below 50% by weight at the total CaO and $SiO_2$ in the starting materials is used for the continuous production of hydrated calcium silicates at high temperature, deposits consisting of various products adhere rigidly on the inner walls of pipings and high pressure vessel and hider the continuous operation. However, when the gelation slurry gelled above 50% by weight at the total CaO and $SiO_2$ in the starting materials is used for the continuous production thereof, the adhesion of the deposits on the inner walls of pipings and high pressure vessel is prevented and the continuous operation is guaranteed.

The gelation ratio in the present invention means the reacted weight ratio of silicic acid and lime to the total weight of silicic acid and lime contained in the raw materials, and the ratio can be calculated from the chemical analysis of the product to obtain the amounts of unreacted silicic acid and unreacted lime.

The gelation slurry containing a silicic material and a calcareous material is performed as illustrated above by heating the aqueous slurry at 50°–100°C for 1–5 hours, and the gelation time is shortened by adding caustic soda, caustic alkali, sodium silicate and/or potassium silicate (hereafter described as alkaline material) of less than 5 weight % $Na_2O$ or $K_2O$ to the total weight of $SiO_2$ and CaO in the raw material. Addition of alkaline material of above 5% hastens the gelation, but the crystallinity of the hydrated calcium silicates obtained by hydrothermally reacting the slurry becomes worse. Addition of alkaline material of 1–5% and $Na_2O$ or $K_2O$ is preferable. When the alkali silicate is added to the aqueous slurry, the amount of the silicic acid in the raw material must be reduced in accordance with the weight of silicic acid contained in the alkali silicate.

It is preferable to heat the gelation slurry thus obtained to above 160°C rapidly in less than 5 min. The heating above 30 min. results in the formation of stable intermediates (CSH(II), CSH(I) etc.), which need longer time for the formation of hydrated calcium silicates and moreover prevent the growth of the crystals of the produced hydrated calcium silicates.

In the embodiment of the present invention the pressurized water of high temperature is used to raise the temperature of the gelation slurry as rapidly as possible to the reaction temperature. There are various methods to heat the gelation slurry rapidly to obtain the hydrated calcium silicate. For example, (1) a method which comprises forcing th pressurized water of high temperature into the high pressure transfer pipe of the gelation slurry or forcing the gelation slurry into the high pressure transfer pipe of the pressurized water of high temperature, allowing it to stand at the temperature for a definite time and then discharging the slurry thus obtained continuously, (2) a method which comprises forcing the pressurized water of high temperature into the high pressure transfer pipe of the gelation slurry or forcing the gelation slurry into the high pressure transfer pipe of the pressurized water of high temperature to raise the temperature and pressure of the gelation slurry charging the heated gelation slurry into the pressure vessel of large capacity, allowing to stand in the vessel at the temperature for a definite time and then discharging the slurry thus obtained continuously, (3) a method which comprises forcing simultaneously the gelation slurry and the pressurized water of high temperature into the pressure vessel of large capacity to raise the temperature of the gelation slurry, allowing to stand at the temperature for a definite time and then discharging the slurry continuously.

It is recommended that the mixture of the gelation slurry and the pressurized water of high temperature is allowed to stand without agitation or with very slow agitation after their mixing and the slurry is discharged from the outlet by utilizing the head pressure. Especially, when the vertical pressure vessel is used for the reaction, it is preferable to force the gelation slurry and the pressurized water of high temperature into the vessel from the lower part of the vessel and to discharge the slurry from the upper part of the vessel.

The preferable reaction temperature in the present invention is above 160°C and is varied by the kind of the hydrated calcium silicates to be produced. The reaction temperature of over 197°C is prefered for the production of xonotlite and that of 180° to 197°C is prefered for the production of tobermorite. It is preferable to use 10–25 times of the pressurized water of high temperature to the total weight of the raw materials. The standing time of the gelation slurry in the high pressure reaction pipe or vessel can be varied according to the reaction condition in the range of 0.5–4 hours. The standing time is not affected by the time needed for the completion of reaction.

The prefered embodiments of the present invention for continuously producing hydrated calcium silicates from the aqueous slurry of a siliceous material and a calcareous material and from the slurry added with alkaline material by hydrothermal reaction has been illustrated above. In addition, when a small amount of a magnesia material is added to the above materials, the gelation velocity does not change, but the hydrothermal reaction of the gelation slurry is activated and the reacting time is shortened. The hydrated calcium silicates thus prepared by adding a magnesia material to the above materials is superior than that prepared without adding a magnesia material in the properties such as heating resistance and self-hardening. The magnesia material is added to the raw materials to bring the composition of the mixture of raw materials in the molar range of $SiO_2:MgO=1.00:(0.6–1.35):(0.02–0.07)$ and to be preferably in the molar range of $(CaO+MgO)/SiO_2=(0.65–1.4):1$. Alkaline material which corresponds to 0.01–0.2 wt.% of the water in the slurry may be added to the aqueous slurry containing raw materials.

Aqueous slurry containing siliceous, calcareous and magnesian materials needs 20 min.–3 hours for its hydrothermal reaction, and the above slurry added with caustic alkali needs 20 min.–3 hours.

The possible time for the continuous operation in the embodiment of the present invention depends on the gelation ratio of the raw materials and the gelation slurry containing a too large amount of gel yields the considerable small size of hydrated calcium silicate crystals, and it is preferable to maintain the gelation ratio to 50–100%. The gelation ratio of about 50% guarantees the continuous operation of over 50 hours.

The properties of the hydrated calcium silicates produced by the present invention changes in accordance with the gelation ratio and the quantity of caustic alkali added to the slurry. The small size of the hydrated calcium silicates is prepared in proportion to the gelation ratio and when the more amount of caustic alkali is added to the slurry worse crystallinity of the hydrated calcium silicates is prepared. Therefore, the various kinds of hydrated calcium silicate having varied properties can be prepared freely by combining the above ratio of the raw materials.

EXAMPLE 1

Amorphous silicic acid powder ($SiO_2$ 55.9%, $R_2O_3$ trace, $Na_2O$ 0.07% Ig. Loss 43.8%, average particle size 15$\mu$) and slaked lime (CaO 73.5%, MgO 0.4%, $R_2O_3$ 0.3%, Ig. Loss 24.4%) were mixed in the molar ratio of CaO : $SiO_2$ = 1.00 : 1.00, aqueous slurry was obtained by adding 4 times water to the total weight of CaO and $SiO_2$ in the raw materials and the slurry was allowed to react for the gelation slurry 90°C for 3 hours. The gelation slurry thus obtained and the pressurized water heated to 213°C (20 kg/cm$^2$) were forced continuously into the conduit pipe at the weight ratio of 1 : 3.5 and charged into the autoclave from the lower part thereof which contained xonotlite slurry and was maintained at 213°C. The mixture was allowed to stand for 1.5 hours and the reaction product was discharged continuously. The properties of products is shown in Table 1.

Table 1

| NaOH added (%) | Ratio of Gelation | Main Product | Crystal Form | Length×width ($\mu$) | Ig. Loss (%) |
|---|---|---|---|---|---|
| 0 | 52 | Xonotlite | rod | 10–15×0.3–0.4 | 4.94 |
| 0.5 | 55 | " | rod+needle | 8–12×0.3 | 4.46 |
| 1.0 | 60 | " | needle+rod | 5–10×0.2–0.3 | 4.19 |
| 1.5 | 65 | " | needle | 5×0.2–0.3 | 3.96 |
| 2.5 | 75 | " | " | 4–5×0.1–0.2 | 3.83 |
| 5 | 81 | " | " | 3–5×0.1 | 5.09 |
| 7.5 | 85 | Xonotlite +CSH | needle +fiber | 3–5×0.03–0.05 | 11.4 |
| 10 | 88 | CSH | fiber | 3–5×0.03–0.05 | 14.8 |

Ig. Loss: 1000°C 1 hour

EXAMPLE 2

Using the same materials as in Example 1, the mixture having the molar ratio of CaO : $SiO_2$ = 1.00 : 1.00 was prepared, 4 times by weight of water and 2.5% of caustic soda to the total weight of CaO and $SiO_2$ in the raw materials were added to the mixture to make slurry and the slurry was separated into three parts and each part was allowed to react the gelation slurry respectively at 70°, 80° and 90°C for 3 hours. The gelation slurry and the pressurized water heated to 213°C (20 kg/cm$^2$) were forced continuously into a conduit pipe at the weight ratio of 1:3.5 by using pump and transferred continuously into the autoclave from the lower part of the autoclave which contained slurry of xonotlite and was maintained at 213°C. The mixture was allowed to stand for 2 hours while slowly agitating, the lower part of the autoclave and the reaction product was discharged continuously. The adhesion of deposits could not be found on the inner walls of pipings and autoclave even after the continuous operation for 7 days.

The products having the properties of Table 2 were obtained.

Table 2

| Temperature for gelation (°C) | Gelation Ratio (%) | Main Product | Size of Crystal Length×Width ($\mu$) |
|---|---|---|---|
| 70 | 55 | Xonotlite | (5–10)×(0.2–0.3) |
| 80 | 64 | " | (5–8)×(0.2–0.3) |
| 90 | 70 | " | (4–5)×(0.1–0.2) |

6% of amosite asbestos fibers to the dry weight of xonotlite was added to the xonotlite slurry thus obtained, boards having the dry bulk density of 0.25 (g/cm$^3$) were moulded by filtering under pressure and the moulded products were dried at 150°C. The results of the physical tests for the plate are shown in Table 3. The result of the tests for the plates obtained by using the xonotlite slurry produced by the batchwise process in the prior art are also shown in the table for comparison.

Table 3

| | Prior Art | | The present invention | | |
|---|---|---|---|---|---|
| Temperature for Gelation (°C) | — | — | 70 | 80 | 90 |
| Reaction time (Hours) | 3 | 6 | | 3 | |
| Bulk Desity (g/cm$^3$) | 0.25 | 0.25 | 0.25 | 0.25 | 0.25 |
| Time for drying (min.) | 420 | 450 | 200 | 210 | 210 |
| Rate of Drying Shrinkage (%) | 2.4 | 2.0 | 0.18 | 0.25 | 0.35 |
| Bending Strength (kg/cm$^2$) | 5.9 | 6.3 | 9.1 | 10.0 | 12.2 |
| Bending Strength/(Bulk Density)$^2$ | 94 | 101 | 146 | 160 | 195 |
| Time for moulding (sec.) | 180 | 150 | 50 | 55 | 65 |
| Rate of Firing Shrinkage (%) | 2.0 | 1.8 | 1.1 | 0.9 | 0.9 |

EXAMPLE 3

Using the same materials as in Example 1, the mixture having the molar ratio of CaO : $SiO_2$=0.83 : 1 was prepared, 4 times by weight of water and 2.5% of caustic soda to the total weight of CaO and $SiO_2$ in the raw materials were added to the mixture to make slurry and the slurry was ground. The ground slurry was heated at 90°C for 3 hours to obtain gelation slurry having 74% of gelation ratio. The gelation slurry and the pressurized water heated to 197°C were forced continuously into a conduit pipe at the ratio of 1:3.5 by using pump and then charged into the autoclave from the lower part of the autoclave which contained tobermorite slurry and was maintained at 197°C (15 kg/cm$^2$). The mixture was allowed to stand for 2 hours while slowly agitating the lower part of the autoclave and the reaction product was discharged continuously to obtain the tobermorite slurry. The adhesion of deposits could not be found on the inner walls of pipings and autoclave even after the continuous operation for 7 days. The resultant product was high degree of crystallinity of 11 A tobermorite.

EXAMPLE 4

Using the magnesian material (MgO 68.3%) and the same silicic acid powder and slaked lime as in Example 1, the mixture having the molar ratio of $CaO:SiO_2:MgO=1.00:1.00:0.03$ was prepared, 4 times of water to the total weight of the raw materials was added to the mixture to make slurry and the slurry was separated into three parts and each part was heated to obtain gelation slurry at 70°, 80° and 90°C respectively to obtain primary gels. Each gelation slurry and the pressurized water heated to 213°C (20 kg/cm$^2$) were forced continuously into a conduit pipe at the ratio of 1:3.5 by using pump and then charged continuously into the autoclave from the lower part of the autoclave which contained xonotlite slurry and was maintained at 213°C. The mixture was allowed to stand for 2 hours while slowly agitating the lower part of the autoclave and the reaction product was discharged continuously. The adhesion of deposits could not be found on the inner walls of pipings and autoclave. The xonotlite having the crystal sizes shown in Table 4 were obtained.

Table 4

| Temperature for gelation (°C) | Gelation Ratio (%) | Main Product | Size of crystals Length×Width ($\mu$) |
|---|---|---|---|
| 70 | 55 | Xonotlite | (7–12)×0.3 |
| 80 | 64 | " | (5–10)×(0.2–0.3) |
| 90 | 70 | " | (5–8)×(0.2–0.3) |

EXAMPLE 5

Using the magnesian material (MgO 68.3%) and the same silicic acid powder and slaked lime as in example 1, a slurry was made by mixing 456 parts of amorphous silicic acid powder, 515 parts of slaked lime, 9 parts of magnesium hydroxide, 11,750 parts of water and some amount of caustic soda shown in Table 5 and the slurry was heated to obtain gelation slurry at 90°C for 3 hours to obtain primary gel. The gelation slurry and the pressurized water heated to 213°C (20 kg/cm$^2$) were forced continuously into a conduit pipe at the ratio of 1:3.5 and then charged into the autoclave from the lower part of the autoclave which contained slurry of xonotlite and was maintained at 213°C. The mixture was allowed to stand for 1.5 hours while slowly agitating the lower part of the autoclave and the reaction product was discharged continuously. Each experiments were continued for 7 days, but the adhesion of deposits on the inner walls of pipings and autoclave could not be found after 7 days. The properties of the xonotlite crystals thus obtained are shown in Table 5.

Table 5

| Caustic soda added (%) | Gelation Ratio (%) | Main product | Crystal Form | Length×width ($\mu$) | Ig loss (%) |
|---|---|---|---|---|---|
| 0.5 | 55 | Xonotlite | bar | (10–15)×(0.3–0.4) | 4.40 |
| 1.0 | 61 | " | bar+ needle | (8–12)×0.3 | 4.10 |
| 1.5 | 65 | " | needle | (5–10)×(0.2–0.3) | 3.84 |
| 2.5 | 75 | " | " | (5–8)×(0.2–0.3) | 3.80 |
| 5.0 | 82 | " | " | (4–5)×0.2 | 5.05 |
| 7.5 | 86 | Xonotlite +CSH | needle +fiber | (3–5)×(0.03–0.1) | 11.2 |
| 10.0 | 89 | CSH | fiber | (1–5)×(0.03–0.05) | 14.6 |

What is claimed is that:

1. A method for producing hydrous calcium silicates continuously, which comprises:
    1. heating a siliceous raw material and a calcareous raw material which is prepared with a SiO$_2$ : CaO molar ratio of about 1.00 : 0.6–1.3, with water so as to form an aqueous slurry until at least 50% of the total CaO and SiO$_2$ in the starting materials has been gelled by reaction at 50–100°C;
    2. heating the gelled product of step (1) to above 160°C in less than 30 minutes by means of pressurized water of high temperature, maintaining this temperature for about 0.5 to 4 hours; and
    3. continuously discharging the reaction product.

2. The method for producing hydrous calcium silicates according to claim 1, wherein a magnesia material is added to the raw materials in the molar ratio of SiO$_2$ : CaO : MgO = 1.00 : (0.6–1.35) : (0.02–0.07) and the molar ratio of (CaO + MgO)/SiO$_2$ = 0.65–1.4 : 1.

3. The method for producing hydrous calcium silicates according to claim 1, wherein said gelled product and 10–25 times by weight of the pressurized water of high temperature are continuously forced into a pressure reactor containing a slurry of hydrous calcium silicates prepared and maintained at above 160°C for 0.5 to 4 hours and then the reaction product is continuously discharged from the reactor.

4. The method for producing hydrous calcium silicates according to claim 1, wherein said gelled product and 10–25 times by weight of the pressurized water of high temperature are continuously forced into the lower part of a pressure reactor containing a slurry of hydrous calcium silicates prepared and maintained at above 160°C for 0.5 to 4 hours and then the reaction product is continuously discharged from the upper part of the reactor.

5. The method for producing xonotlite which comprises:
    1. interacting a siliceous raw material and a calcareous raw material which is prepared with a SiO$_2$ : CaO molar ratio of 1.00 : 1.00 with water so as to form an aqueous slurry until at least 50% of the total of CaO and SiO$_2$ in the starting materials has been gelled by reaction at 50°–100°C;
    2. heating the gelled product of step (1) to above 197°C in less than 30 minutes by means of pressurized water of high temperature, maintaining this temperature for about 0.5–4 hours; and
3. discharging the reaction product continuously.

6. The method for producing tobermorite which comprises:
   1. interacting a siliceous raw material and a calcareous raw material which is prepared with a $SiO_2$ : CaO molar ratio of 1.00 : 0.80–0.85 with water so as to form an aqueous slurry until at least 50% of the total of CaO and $SiO_2$ in the starting materials has been gelled by reaction at 50°–100°C;
   2. heating the gelled product of step (1) to 180°–197°C in less than 30 minutes by means of pressurized water of high temperature, maintaining this temperature for about 0.5–4 hours; and
   3. discharging the reaction product continuously.

7. The method for producing hydrous calcium silicates according to claim 1, wherein the quantity of water in the aqueous slurry is 2.5–20 times by weight of the total weight of the raw materials.

8. The method for producing hydrous calcium silicates according to claim 1 wherein at least one alkaline material selected from the group consisting of sodium hydroxide, potassium hydroxide, sodium silicate, and potassium silicate is added to the aqueous slurry by 0.01–0.2% by weight based on $Na_2O$ or $K_2O$ to the total weight of water in the aqueous slurry.

9. The method for producing hydrous calcium silicates according to claim 2, wherein at least one alkaline material selected from the group consisting of sodium hydroxide, potassium hydroxide, sodium silicate and potassium silicate is added to the aqueous slurry in 0.01–0.2% by weight based on $Na_2O$ or $K_2O$ to the total weight of water in the aqueous slurry.

* * * * *